(12) United States Patent
Sonoda et al.

(10) Patent No.: US 8,304,944 B2
(45) Date of Patent: Nov. 6, 2012

(54) ELECTRIC POWER-STEERING APPARATUS MOTOR APPARATUS

(75) Inventors: Isao Sonoda, Chiyoda-ku (JP); Yoshihito Asao, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 317 days.

(21) Appl. No.: 12/729,805

(22) Filed: Mar. 23, 2010

(65) Prior Publication Data

US 2011/0067945 A1 Mar. 24, 2011

(30) Foreign Application Priority Data

Sep. 24, 2009 (JP) ................................. 2009-219301

(51) Int. Cl.
*B62D 5/04* (2006.01)
(52) U.S. Cl. ..................................... 310/68 B; 310/68 R
(58) Field of Classification Search .................. 180/443, 180/444, 446; 310/68
See application file for complete search history.

(56) References Cited

U.S. PATENT DOCUMENTS

| | | | | |
|---|---|---|---|---|
| 5,975,234 A * | 11/1999 | Bugosh et al. | ............... | 180/444 |
| 6,144,137 A * | 11/2000 | Engelbert | ..................... | 310/431 |
| 6,491,131 B1 * | 12/2002 | Appleyard | ..................... | 180/444 |
| 6,577,030 B2 * | 6/2003 | Tominaga et al. | .......... | 310/68 B |
| 6,655,003 B2 * | 12/2003 | Ganser | ............................. | 29/596 |
| 7,021,418 B2 * | 4/2006 | Tominaga et al. | ............ | 180/444 |
| 7,253,546 B2 * | 8/2007 | Fukuda et al. | ................ | 310/179 |
| 7,358,699 B2 * | 4/2008 | Kikuchi et al. | ............... | 318/727 |
| 7,445,081 B2 * | 11/2008 | Tominaga | ..................... | 180/444 |
| 2002/0189892 A1* | 12/2002 | Appleyard | ..................... | 180/444 |
| 2006/0238040 A1* | 10/2006 | Utsumi et al. | .............. | 310/68 B |
| 2007/0144822 A1* | 6/2007 | Tominaga et al. | ............ | 180/444 |
| 2007/0205038 A1* | 9/2007 | Tominaga et al. | ............ | 180/444 |
| 2007/0246289 A1* | 10/2007 | Tominaga | ..................... | 180/444 |

FOREIGN PATENT DOCUMENTS

| | | |
|---|---|---|
| JP | 3830006 A | 10/1999 |
| JP | 2006-121857 A | 5/2006 |
| WO | WO 2010007672 A1 * | 1/2010 |

* cited by examiner

*Primary Examiner* — Tran Nguyen
*Assistant Examiner* — Naishadh Desai
(74) *Attorney, Agent, or Firm* — Sughrue Mion, PLLC

(57) ABSTRACT

A first end region of a rotating shaft of a rotor of a brushless motor is inserted through a control apparatus housing space, and is supported by a first bearing that is held by a first bearing box that is disposed on a first surface side of a base portion of a first housing that configures the control apparatus housing space, and a second end is supported by a second bearing that is held by a second bearing box that is disposed in a motor frame that configures a motor housing space. A control apparatus is disposed inside the control apparatus housing space, and an end portion of the rotating shaft that projects out through the first bearing constitutes a coupling portion.

12 Claims, 5 Drawing Sheets

ELECTRIC POWER-STEERING APPARATUS MOTOR APPARATUS

BACKGROUND OF THE INVENTION

1. Field of the Invention

The present invention relates to an electric power-steering apparatus motor apparatus that is mounted to an automotive vehicle to assist steering effort by a driver, for example.

2. Description of the Related Art

Conventional pumping devices that supply oil to electric power steering apparatuses include: a heat sink is configured into a hollow shape by joining together with and fixing to a flat first member a first end surface of a second member that is formed into a vessel shape in which a first end surface is open; a motor that is mounted by joining together and fixing a motor frame to an outer surface of the first member; a pumping unit that is mounted to an outer surface of the second member; and a control unit that is joined together with and fixed to an inner surface of the second member of the heatsink where the pumping unit is disposed, and that controls driving of the motor. A first end portion of a rotating shaft of the motor is rotatably held by a first bearing that is disposed inside the motor frame, and an intermediate portion thereof is rotatably held by a second bearing that is disposed in a penetrating aperture that is formed on the first member. In addition, a second end portion of the rotating shaft projects through a penetrating aperture that is formed on the second member, and is linked to a drive shaft of the pumping unit by means of a coupling such that the pumping unit is driven by the rotating shaft of the motor and circulates oil (see Patent Literature 1, for example).

In conventional pumping devices, an inclination generally arises in a central axis of the rotating shaft that is determined by the first bearing and the second bearing relative to a central axis of the drive shaft of the pumping unit that is mounted to the outer surface of the second member due to core misalignment due to dimensional tolerances and combinations of parts, etc.

In conventional pumping devices, because the first end portion of the rotating shaft of the rotor is rotatably held by the first bearing that is disposed inside the motor frame, and the intermediate portion is rotatably held by the second bearing that is disposed on the first member, and a second end region passes through the heatsink and projects from the penetrating aperture that is formed on the second member, axial length between the second bearing and the coupling that is disposed on the second end of the rotating shaft is increased. Thus, one problem has been that vibration of the coupling is increased, increasing vibration of the pumping unit, and reducing reliability.

Because an outside diameter of the second end region of the rotating shaft that projects out through the second bearing is smaller than an inside diameter of an inner ring of the second bearing, rigidity of the second end region of the rotating shaft is reduced, and one problem has been that vibration and torque response lag arise due to torsion resonance, reducing reliability. In order to solve this problem, it is conceivable that the diameter of the second end region of the rotating shaft could be increased to increase rigidity, but in that case, it would be necessary to increase the diameter of the second bearing, giving rise to new problems such as enlargement of the device and cost increases.

Another problem has been that foreign matter may enter the heatsink through gaps between the second end region of the rotating shaft and the penetrating aperture that is disposed on the second member, giving rise to short-circuiting of the control unit, and reducing reliability.

In consideration of these conditions, conventional electric power steering apparatuses have been proposed in which a control apparatus is disposed in a space that is made by placing a first end of a first housing and a first end of a second housing in contact with each other, a motor is disposed inside a frame that is mounted to a second end of the first housing, an actuator is disposed at a second end of the second housing, a first end region of a rotating shaft of the motor is rotatably held by a first bearing that is disposed in a penetrating aperture that is formed on the second housing, a second end portion of the rotating shaft is rotatably held by a second bearing that is disposed in the frame, and a first end portion of the rotating shaft that projects out through the first bearing is linked with a drive shaft of the actuator by means of a coupling (see Patent Literature 2, for example).

In conventional electric power steering apparatuses, because the actuator is disposed at the second end of the second housing, and the drive shaft thereof is linked by means of the coupling to the first end portion of the rotating shaft of the motor that projects out through the first bearing that is disposed in the penetrating aperture that is formed on the second housing, axial length between the first bearing and the coupling that is disposed on the first end of the rotating shaft is shortened. Thus, vibration of the coupling is suppressed, reducing vibration of the actuator, and increasing reliability.

Portions of the rotating shaft between the first and second bearings are thickened, enabling rigidity of the rotating shaft to be increased without increasing the diameters of the first and second bearings, suppressing vibration and torque response lag due to torsion resonance, and enabling reliability to be increased.

In addition, because the two ends of the rotating shaft are held by the first and second bearings, foreign matter is less likely to enter the space that is made by placing the first end of the first housing and the first end of the second housing in contact with each other, suppressing occurrences of short-circuiting of the control apparatus, and increasing reliability.

Patent Literature 1: Japanese Patent No. 3830006 (Gazette)

Patent Literature 2: Japanese Patent Laid-Open No. 2006-121857 (Gazette)

In conventional electric power steering apparatuses, because the first bearing is inserted into and held by the bearing box of the second housing from a first housing side, a first bearing axial positioning wall portion of the bearing box is positioned between the first bearing and the actuator. Thus, because a distance between the first bearing and the first end of the rotating shaft is extended by a distance equivalent to the thickness of the first bearing axial positioning wall portion, one disadvantage has been that vibration of the coupling is increased, increasing vibration of the actuator, and giving rise to reductions in reliability.

SUMMARY OF THE INVENTION

The present invention aims to solve the above problems and an object of the present invention is to provide a highly reliable, compact, and low cost electric power-steering apparatus motor apparatus in which a bearing box is disposed on a first surface side of a base portion to shorten a length between a coupling portion on an axial end of a rotating shaft that projects out through a bearing that is held by the bearing box and the bearing.

In order to achieve the above object, according to one aspect of the present invention, there is provided an electric power-steering apparatus motor apparatus including: a flat base portion on a first surface side of which a first bearing box is disposed; a tubular first peripheral wall portion that is disposed on a second surface side of the base portion and that functions together with the base portion to configure a control apparatus housing space; a tubular second peripheral wall portion that is disposed on an opposite side of the first peripheral wall portion from the base portion; a floored cylindrical motor frame that is that is disposed on an opposite side of the second peripheral wall portion from the base portion so as to function together with the second peripheral wall portion to configure a motor housing space, and on a bottom portion of which a second bearing box is disposed; a motor including: a stator including: a stator core that is held inside the motor frame; and a stator winding that is mounted to the stator core; and a rotor that is disposed rotatably on an inner circumferential side of the stator such that a first end region of a rotating shaft is inserted through the control apparatus housing space and is supported by a first bearing that is held by the first bearing box, and a second end of the rotating shaft is supported by a second bearing that is held by the second bearing box, a first end of the rotating shaft that projects out through the first bearing constituting a coupling portion; and a control apparatus that is disposed inside the control apparatus housing space, and that controls driving of the motor.

According to the present invention, because a first bearing box is disposed on a first surface side of a base portion, a wall portion of the first bearing box, which positions an axial position of a first bearing, is present on a control apparatus housing space side of the base portion. Thus, a distance between a coupling portion at an axial end of the rotating shaft that projects out through the first bearing and the first bearing is shortened, suppressing vibration of the coupling portion, and thereby enabling reliability to be increased.

A portion of the rotating shaft between the first and second bearings can be thickened and rigidity of the rotating shaft increased without increasing diameters of first and second bearings, suppressing vibration and torque response lag due to torsion resonance, and enabling reliability to be increased, and also enabling size and cost reductions.

In addition, because the two ends of the rotating shaft are held by the first and second bearings, foreign matter is less likely to enter the control apparatus housing space, suppressing occurrences of short-circuiting of the control apparatus, and increasing reliability.

DETAILED DESCRIPTION OF THE PREFERRED EMBODIMENTS

Embodiment 1

Figure 1:
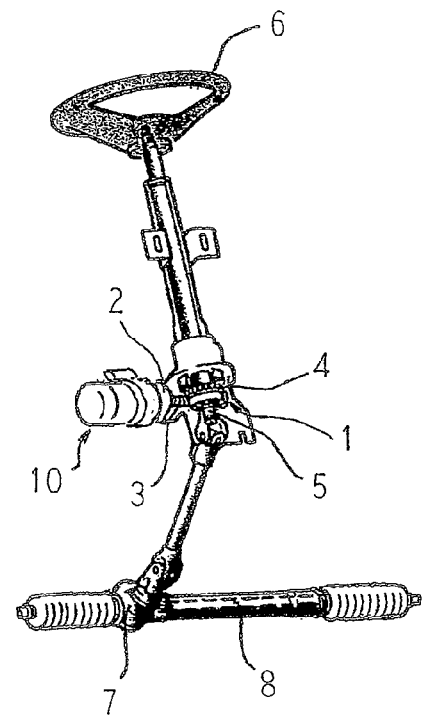
FIG. 1 is a perspective that explains an overall configuration of an electric power steering apparatus according to Embodiment 1 of the present invention.
Figure 2:
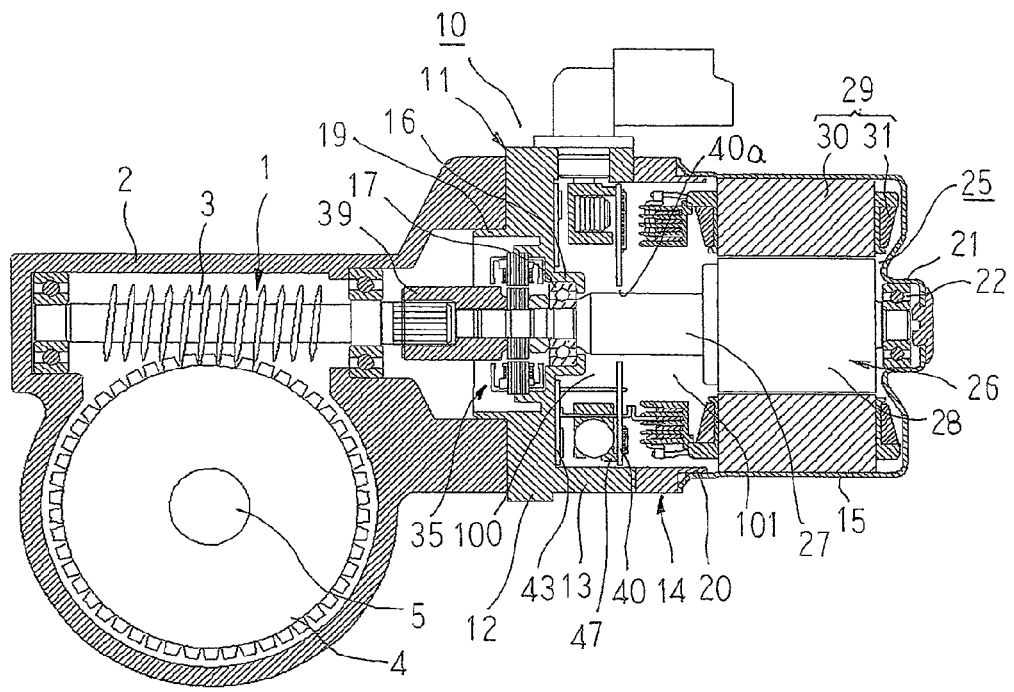
FIG. 2 is a partial cross section that explains the overall configuration of the electric power steering apparatus according to Embodiment 1 of the present invention.
Figure 3:
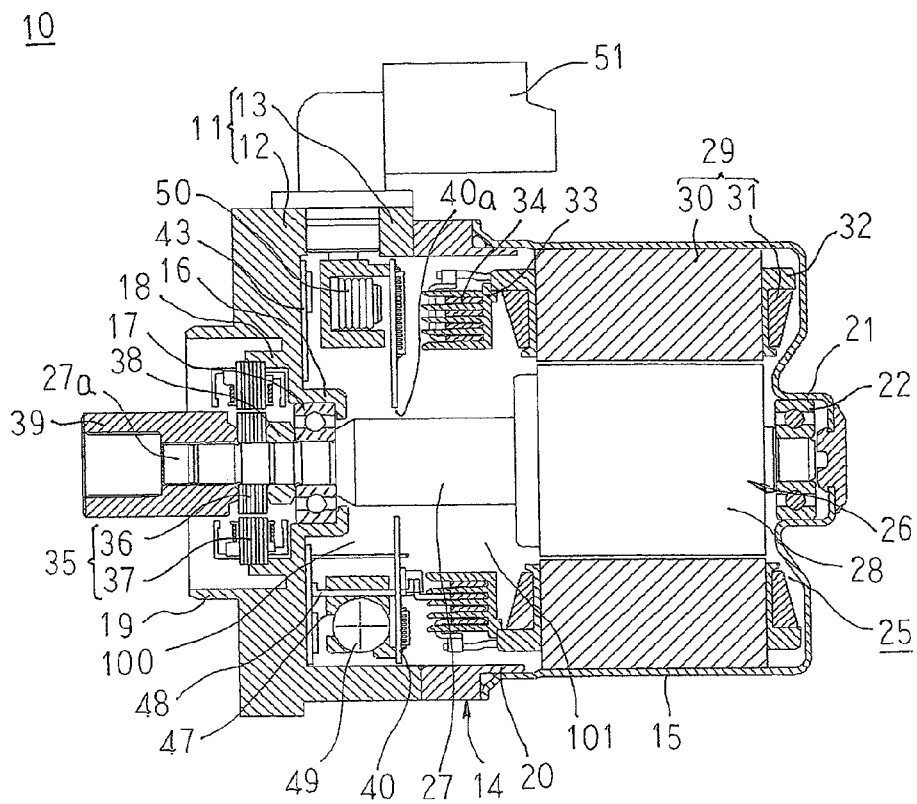
FIG. 3 is a cross section that explains a configuration of an electric power steering apparatus motor apparatus according to Embodiment 1 of the present invention.
Figure 4:
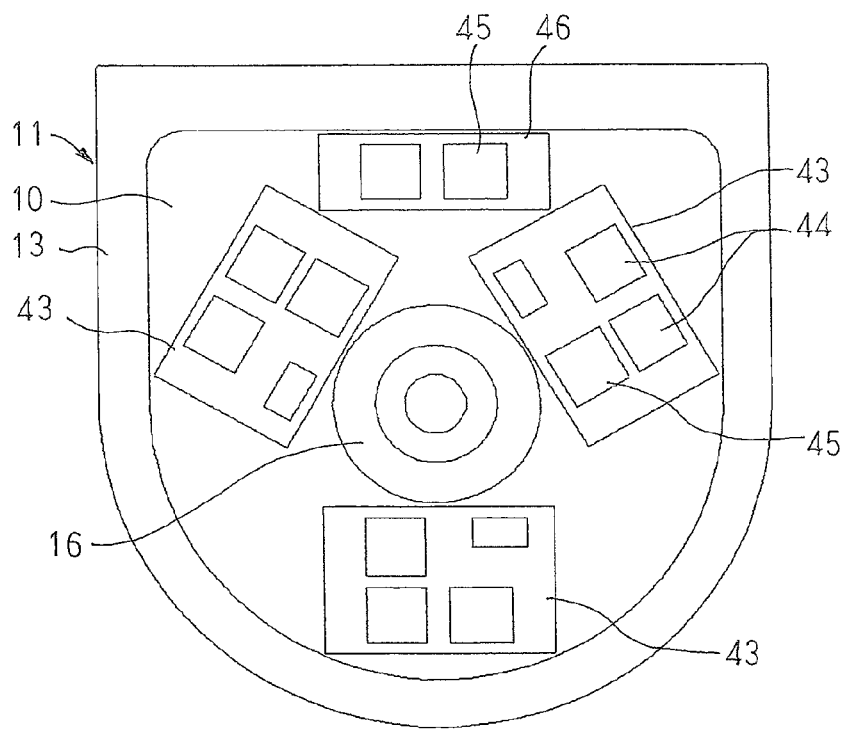
FIG. 4 is a diagram that explains a layout of power boards in the electric power steering apparatus motor apparatus according to Embodiment 1 of the present invention.
Figure 5:
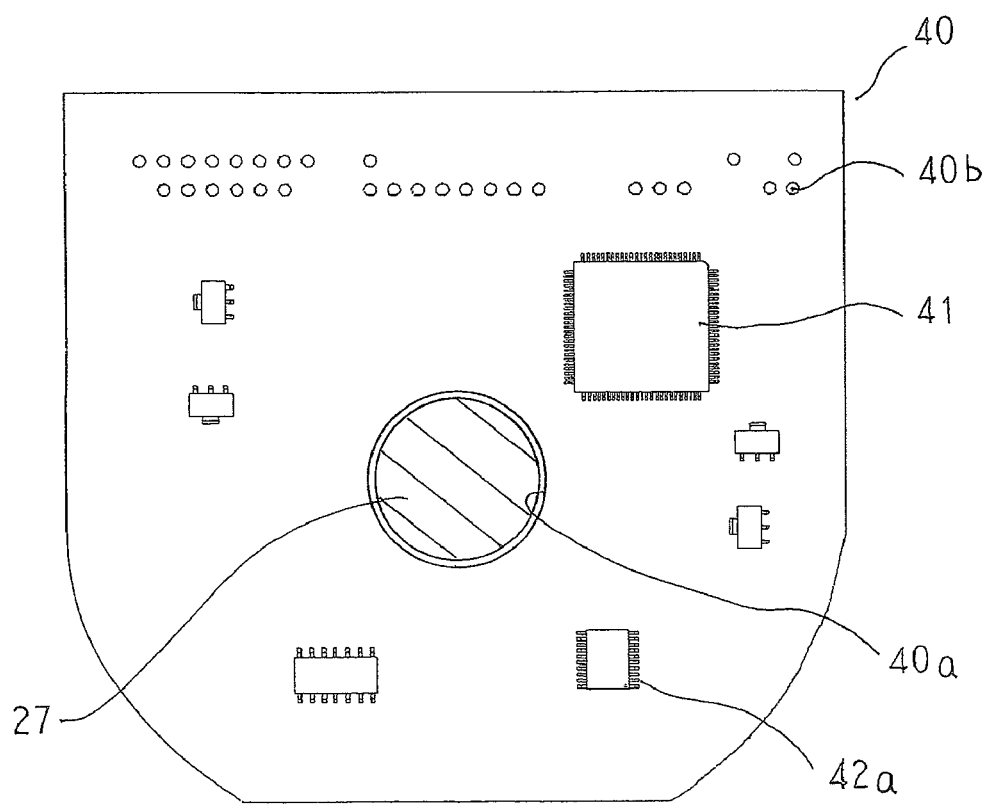
FIG. 5 is a diagram that explains a layout of a control board in the electric power steering apparatus motor apparatus according to Embodiment 1 of the present invention.
Figure 6:
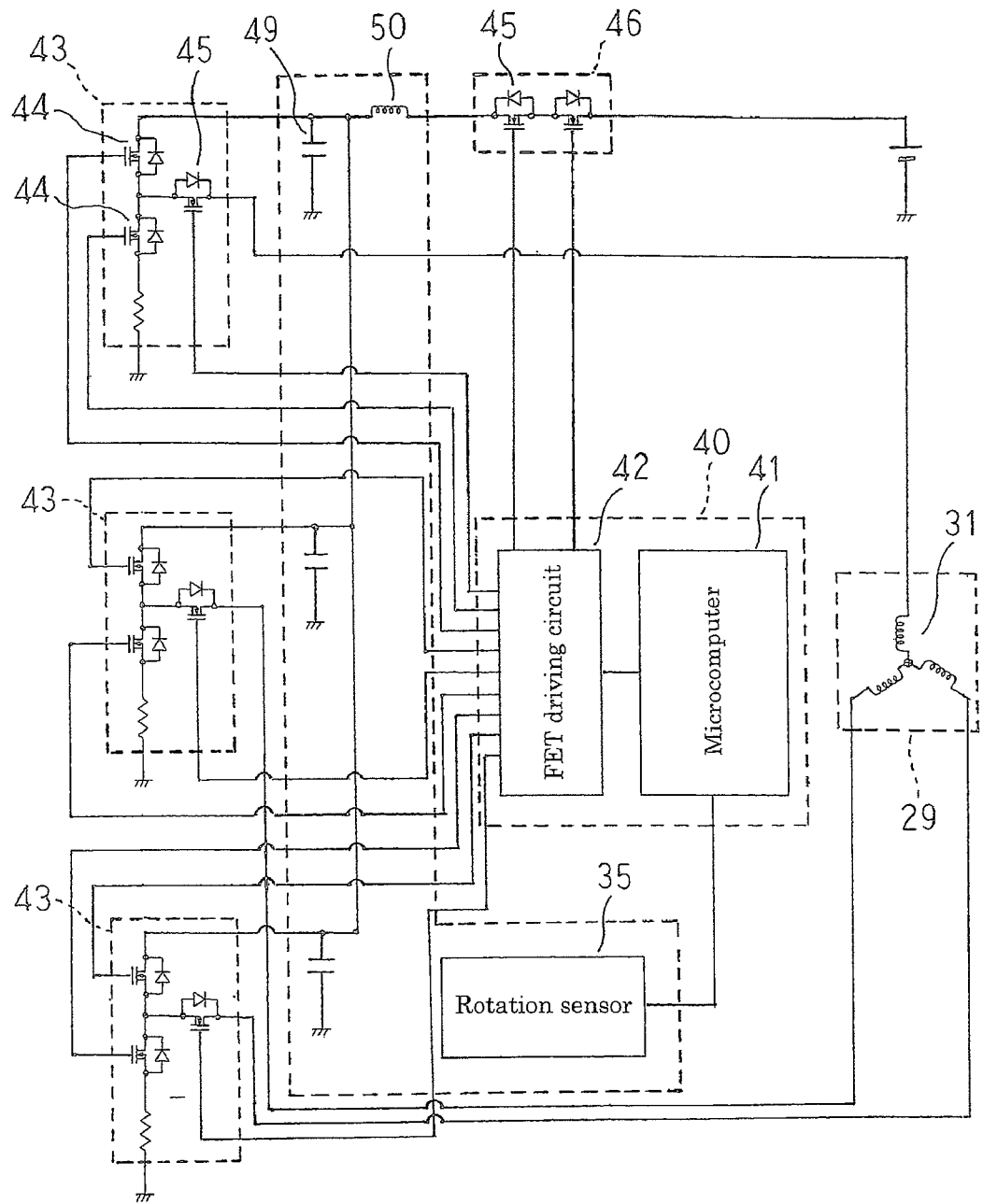
FIG. 6 is a circuit block diagram for the electric power steering apparatus motor apparatus according to Embodiment 1 of the present invention.

FIG. 1 is a perspective that explains an overall configuration of an electric power steering apparatus according to Embodiment 1 of the present invention, FIG. 2 is a partial cross section that explains the overall configuration of the electric power steering apparatus according to Embodiment 1 of the present invention, FIG. 3 is a cross section that explains a configuration of an electric power steering apparatus motor apparatus according to Embodiment 1 of the present invention, FIG. 4 is a diagram that explains a layout of power boards in the electric power steering apparatus motor apparatus according to Embodiment 1 of the present invention, FIG. 5 is a diagram that explains a layout of a control board in the electric power steering apparatus motor apparatus according to Embodiment 1 of the present invention, and FIG. 6 is a circuit block diagram for the electric power steering apparatus motor apparatus according to Embodiment 1 of the present invention.

In FIG. 1, an electric power-steering apparatus motor apparatus 10 is mounted onto a gear housing 2 in which a worm speed reducing mechanism 1 is accommodated, and is linked to a worm shaft 3 by means of a boss 39 that is described below. Torque from a rotating shaft 27 of a brushless motor 25 (described below) of the electric power-steering apparatus motor apparatus 10 is transmitted to the worm shaft 3 by means of the boss 39, and is transmitted to a worm wheel 4 such that rotational speed of the worm shaft 3 is reduced. Thus, configuration is such that torque from the rotating shaft 27 of the brushless motor 25 is decelerated by the worm speed reducing mechanism 1 and transmitted to a column shaft 5 so as to assist steering effort at a steering wheel 6. Torque from the column shaft 5 is transmitted by means of a universal joint to a pinion of a gear unit 7 that forms a rack-and-pinion gear mechanism, and is configured such that a rack 8 that intermeshes with this pinion is driven horizontally.

Next, detailed configuration of the electric power-steering apparatus motor apparatus 10 will be explained while referring to FIGS. 2 and 3.

An electric power-steering apparatus motor apparatus 10 includes: a first housing 11 that is mounted to the gear housing 2, and that configures a control apparatus housing space 100; a second housing 14 that is mounted to the first housing 11; a motor frame 15 that is mounted to the second housing 14, and that functions together with the second housing 14 to configure a motor housing space 101; a brushless motor 25 that is disposed inside the motor housing space 101; a control apparatus that is disposed inside the control apparatus housing space 100, and that performs energizing control of the brushless motor 25; and a rotation sensor 35 that detects a rotational position of a rotor 26 of the brushless motor 25.

The first housing 11 is prepared by die casting an aluminum alloy, for example, and has: a flat base portion 12; and a tubular first peripheral wall portion 13 that is disposed so as to protrude integrally from a second surface side of the base portion 12. A first bearing box 16 is formed on a first surface side of a central portion of the base portion 12. Specifically, the first bearing box 16 is formed on the base portion 12 so as to enable the first bearing 17 to be inserted from the first surface side of the base portion 12 and held. A rotation sensor positioning projection 18 is disposed so as to project in a cylindrical shape from the first surface of the base portion 12 so as to be coaxial with the first bearing box 16. In addition, a first spigot portion 19 is disposed so as to project in a cylindrical shape from the first surface of the base portion 12 so as to be coaxial with the first bearing box 16 and so as to be radially outside the rotation sensor positioning projection 18.

The second housing 14, which functions as a second peripheral wall portion, is prepared so as to have a tubular shape by die casting an aluminum alloy, for example. A second spigot portion 20 is disposed so as to project from an end surface of the second housing 14 in a cylindrical shape.

The motor frame 15 is prepared so as to have a floored cylindrical body using iron, for example. A second bearing box 21 is formed on a central portion of a bottom portion of the motor frame 15 so as to enable the second bearing 22 to be inserted from inside. The motor frame 15 is fitted over the second spigot portion 20, and is mounted to the second housing 14 by the fastening with a screw, for example.

The brushless motor 25 is a permanent-magnet synchronous motor that includes: a rotor 26 that has: a rotating shaft 27; and a cylindrical permanent magnet 28 that is fitted over and fixed to the rotating shaft 27; and a stator 29 that has: a stator core 30 that is prepared by laminating and integrating electromagnetic steel plates; and a three-phase stator winding 31 that is mounted to the stator core 30 so as to have a resin insulator 32 interposed.

The stator 29 is mounted to the motor frame 15 by press-fitting the stator core 30 inside the motor frame 15. The rotor 26 is rotatably mounted such that a first end region of the rotating shaft 27 is inserted through the control apparatus housing space 100 and is supported by the first bearing 17, and a second end of the rotating shaft 27 is supported by the second bearing 22. The permanent magnet 28 is disposed inside the motor frame 15 on an inner circumferential side of the stator core 30 so as to ensure a predetermined air gap. The permanent magnet 28 is magnetized into six poles circumferentially, for example, and the three-phase stator winding 31 is wye-connected using motor connecting terminals 34 that are insert-molded into the resin terminal holder 33.

The rotation sensor 35 includes: a resolver rotor 36 that functions as a sensor rotor that is fitted over and fixed to a portion of the rotating shaft 27 that projects through the first bearing 17; and a resolver stator 37 that is disposed so as to surround the resolver rotor 36 by being positioned by the rotation sensor positioning projection 18 and fastened to the first surface of the base portion 12 by a screw (not shown), etc. Although not shown, a signal wire from the rotation sensor 35 is led out into the control apparatus housing space 100 through a penetrating aperture that has been opened through the base portion 12, and is electrically connected to a control board 40 that is described below, and a rubber plate is disposed so as to cover the penetrating aperture, preventing entry of foreign matter to the control apparatus housing space 100 through the penetrating aperture. A bush 38 is prepared so as to have a ring body that is made of iron, and is interposed on a portion of the rotating shaft 27 between the first bearing 17 and the resolver rotor 36 such that an axial position of the resolver rotor 36 is adjusted. The boss 39, which constitutes a coupling, is fixed to a coupling portion 27a on a first end of the rotating shaft 27.

The control apparatus has: a glass-reinforced epoxy resin control board 40 through which a rotating shaft insertion aperture 40a is opened, and onto which electronic components such as a driver IC 42a, etc., that constitute a microcomputer 41 and a field-effect transistor (FET) driving circuit 42 are mounted so as to be distributed circumferentially so as to surround the rotating shaft insertion aperture 40a; ceramic power boards 43 to which power elements 44 such as power metal-oxide-semiconductor field-effect transistors (MOSFETs), etc., and semiconductor switching elements 45 have been mounted; and a ceramic switch board 46 to which semiconductor switching elements 45 have been mounted. A terminal portion 47 is a resin-molded part into which inserted conductors 48 are insert molded. A capacitor 49 that absorbs ripples in the electric current that flows to the brushless motor 25, and a coil 50 that absorbs noise are mounted onto the terminal portion 47. In addition, second ends of the semiconductor switching elements 45 of the switch board 46 are connected to a power source connector 51.

As shown in FIG. 4, three power boards 43 that correspond to respective phases of the stator winding 31 are mounted to a second surface of the base portion 12 of the first housing 11 so as to be placed in close contact with the base portion 12 so as to be arranged in a row circumferentially at a uniform angular pitch so as to surround the first bearing box 16. As shown in FIG. 4, the switch board 46 is mounted so as to be in close contact with the second surface of the base portion 12 of the first housing 11. The control board 40 is mounted to the terminal portion 47, and is disposed inside the control apparatus housing space 100 so as to be separated by a predetermined distance from the second surface of the base portion 12 such that an aperture center of the rotating shaft insertion aperture 40a is aligned with a central axis of the first bearing box 16. Thus, as shown in FIG. 5, the control board 40 is disposed so as to be perpendicular to a central axis of the rotating shaft 27 that is inserted through the rotating shaft insertion aperture 40a, and the electronic components such as the driver IC 42a, etc., that constitute the microcomputer 41 and the FET driving circuit 42 are arranged so as to be distributed circumferentially so as to surround the rotating shaft 27. The control board 40, the power boards 43, the capacitor 49, the coil 50, the stator winding 31, etc., are electrically connected by inserting an output terminal of the stator winding 31, the inserted conductors 48, etc., into a penetrating aperture 40b of the control board 40 and soldering them to a wiring pattern (not shown) of the control board 40 so as to configure an electrical circuit that is shown in FIG. 6.

An electric power-steering apparatus motor apparatus 10 that is configured in this manner can be mounted by fitting the first spigot portion 19 into the gear housing 2 and fastening the base portion 12 to the gear housing 2 using a screw, etc. The coupling portion 27a of the rotating shaft 27 is linked to the worm shaft 3 by means of the boss 39. The brushless motor 25 can thereby be activated and controlled by the control apparatus and driven to rotate. Thus, torque from the rotating shaft 27 of the brushless motor 25 is transmitted to the worm shaft 3 by means of the boss 39, and is decelerated by the worm speed reducing mechanism 1 and transmitted to a column shaft 5 to assist steering effort at a steering wheel 6.

According to Embodiment 1, a first bearing box 16 is disposed on a base portion 12 that constitutes a first housing 11 and a second bearing box 21 is disposed on a bottom portion of a motor frame 15. A rotor 26 is rotatably mounted such that a first end region of a rotating shaft 27 is inserted through a control apparatus housing space 100 and is supported by a first bearing 17 that is held by the first bearing box 16, and a second end of the rotating shaft 27 is supported by a second bearing 22 that is held by the second bearing box 21.

A distance between a coupling portion 27a on the first end of the rotating shaft 27 and a first bearing 17 is thereby shortened. Thus, vibration of a boss 39 that is fixed to the coupling portion 27a that results from the inclination of the rotating shaft 27 is reduced, suppressing vibration of a worm speed reducing mechanism 1.

Thicknesses of portions of the rotating shaft 27 between the first bearing 17 and the second bearing 22 can also be increased without increasing the diameters of the first bearing 17 and the second bearing 22. Thus, occurrences of the vibration and torque response lag due to torsion resonance that results from insufficient rigidity of the rotating shaft 27 are suppressed. In addition, the need to increase diameters of the first bearing 17 and the second bearing 22 is eliminated, enabling increases in bearing cost and increases in the size of the electric power-steering apparatus motor apparatus 10 to be suppressed, thereby enabling a compact, low-cost electric power-steering apparatus motor apparatus 10 to be achieved.

Because the first bearing box 16 is disposed on a first surface side of the base portion 12, a wall portion of the first bearing box 16 that determines an axial position of the first bearing 17 is positioned on a control apparatus housing space 100 side of the first bearing 17.

Thus, because a distance between the first bearing 17 and the coupling portion 27a is shortened by an amount proportionate to the wall portion that determines the axial position of the first bearing 17 no longer being present between the first bearing 17 and the coupling portion 27a of the first end of the rotating shaft 27, vibration of the boss 39 is reduced, further suppressing the vibration of the worm speed reducing mechanism 1, and enabling reliability to be improved.

Because a bush 38 and a resolver rotor 36 are fitted onto portions between the boss 39 of the rotating shaft 27 and the first bearing 17, rigidity of a portion of the rotating shaft 27 that projects from the first bearing 17 can be increased without increasing the diameter of the projecting portion in question. Because resonance frequencies of the rotor 26 are thereby increased, vibrations that are generated due to resonance with a control period of the brushless motor 25 can be eliminated.

Because a resolver that has a high angular resolution is used as the rotation sensor 35, rotational speed of the rotor 26 can be detected with high precision.

Because the resolver rotor 36 is mounted to the rotating shaft 27 in close proximity to the first bearing 17, vibration of the resolver rotor 36 that results from vibration of the rotating shaft 27 can be reduced, increasing angle detecting precision by the rotation sensor 35, and enabling steering feel to be improved.

Because the rotation sensor 35 is mounted to the base portion 12 and the rotating shaft 27 from a first surface side (a side near the worm speed reducing mechanism 1) of the base portion 12, the mounted angle of the rotation sensor 35 can be adjusted from outside, making zeroing of the resolver angle possible. The rotation sensor 35 is constituted by a resolver that detects angle from changes in magnetic flux, but an aluminum base portion 12 and an iron first bearing 17 are interposed between the rotation sensor 35 and the power boards 43. Thus, magnetic effects on the power boards 43 and on the rotation sensor 35 from the power boards 43 due to wiring to the stator winding 31 are suppressed, increasing the angle detecting precision of the rotation sensor 35.

Because a control board 40 that constitutes a control apparatus is disposed so as to be perpendicular to a central axis of the rotating shaft 27, which is inserted through a rotating shaft insertion aperture 40a, and electronic components such as a driver IC 42a, etc., that constitute a microcomputer 41 and an FET driving circuit 42 are arranged so as to be distributed circumferentially so as to surround the rotating shaft 27, cross-sectional area of the electric power-steering apparatus motor apparatus 10 perpendicular to the rotating shaft 27 can be reduced, enabling degree of freedom in mounting the apparatus to an automotive vehicle to be increased.

Because the power boards 43 are mounted so as to contact the base portion 12, heat that is generated by the power elements 44 that are mounted to the power boards 43 is transferred to the base portion 12, and is radiated from the front surface of the base portion 12, enabling excessive temperature increases in the power elements 44 to be suppressed. Thus, the base portion 12 is prepared so as to have a predetermined thickness that meets requirements for heat that is generated in the power elements 44 to be radiated effectively. Plate thickness of the base portion 12 is a thickness sufficient to form first bearing box 16, enabling the first bearing box 16 to be formed without further increasing the thickness of the base portion 12.

Embodiment 2

Figure 7:
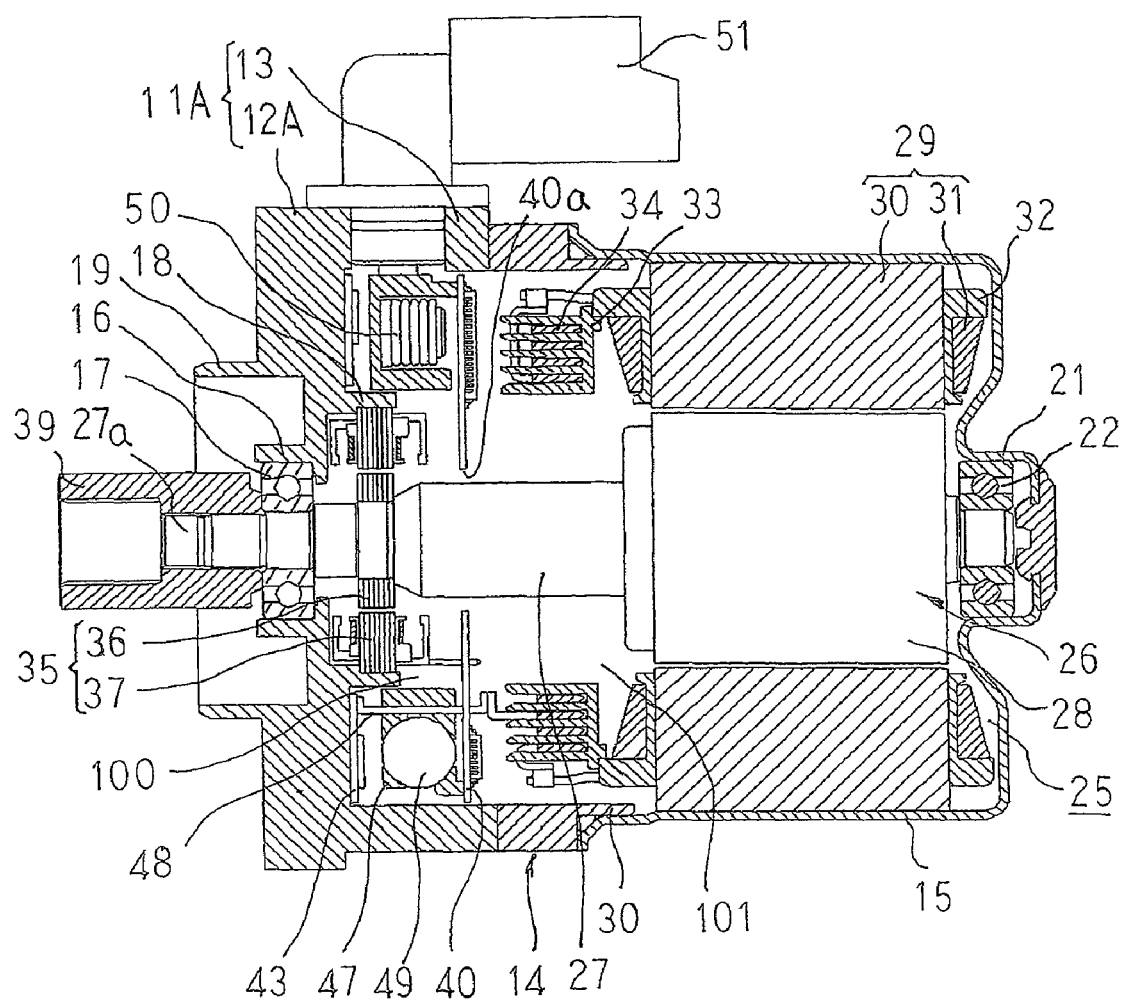
FIG. 7 is a cross section that explains a configuration of an electric power steering apparatus motor apparatus according to Embodiment 2 of the present invention.

FIG. 7 is a cross section that explains a configuration of an electric power steering apparatus motor apparatus according to Embodiment 2 of the present invention.

In FIG. 7, a first housing 11A is prepared by die casting an aluminum alloy, for example, and has: a flat base portion 12A; and a tubular first peripheral wall portion 13 that is disposed so as to protrude integrally from a second surface side of the base portion 12A. A first bearing box 16 is formed on a first surface side of a central portion of the base portion 12A. A rotation sensor positioning projection 18 is disposed so as to project in a cylindrical shape from a second surface of the base portion 12A so as to be coaxial with the first bearing box 16. In addition, a first spigot portion 19 is disposed so as to project in a cylindrical shape from the first surface of the base portion 12A so as to be coaxial with the first bearing box 16.

A resolver rotor 36 is fitted over and fixed to a rotating shaft 27 in close proximity to the first bearing 17, and a resolver stator 37 is disposed so as to surround the resolver rotor 36 by being positioned by the rotation sensor positioning projection 18 and fixed to the second surface of the base portion 12A by a screw (not shown), etc. A boss 39 is fixed to a coupling portion 27a on the first end of the rotating shaft 27.

Moreover, the rest of the configuration is configured in a similar manner to Embodiment 1 above.

In an electric power-steering apparatus motor apparatus 10A that is configured in this manner, because a rotation sensor 35 is disposed inside a control apparatus housing space 100, length of projection of a rotating shaft 27 from a first bearing 17 can be shortened. Thus, a distance between the boss 39 and the first bearing 17 is further shortened, reducing vibration of the boss 39 that results from inclination of the rotating shaft 27, and suppressing vibration of a worm speed reducing mechanism 1.

Because length of a portion of the rotating shaft 27 that constitutes a small diameter portion that projects from the first bearing 17 is shortened, and portions of the rotating shaft 27 between the first bearing 17 and the second bearing 22 can be increased in diameter, rigidity of the rotating shaft 27 is increased. Because resonance frequencies of the rotor 26 are thereby increased, vibrations that are generated due to resonance with a control period of the brushless motor 25 can be eliminated.

A penetrating aperture for leading a signal wire of the rotation sensor 35 into the control apparatus housing space 100 is no longer required, preventing entry of foreign matter into the control apparatus housing space 100. The signal wire of the rotation sensor 35 can also be electrically connected to the control board 40 easily.

Because the axial position of the resolver rotor 36 can be positioned by the rotating shaft 27, a bush is no longer required, enabling configuration to be simplified and costs to be reduced proportionately.

Moreover, in each of the above embodiments, the present invention is explained as being applied to a use in which the electric power-steering apparatus motor apparatus assists steering effort on a steering wheel, but use of this electric power-steering apparatus motor apparatus is not limited to use assisting steering effort on a steering wheel, and for example, may also be applied to use driving a power steering pumping apparatus.

In each of the above embodiments, a first peripheral wall portion that functions together with a base portion to configure a control apparatus housing space is prepared integrally with the base portion, but a first housing may also be constituted only by a base portion, and a first peripheral wall portion prepared integrally with a second housing that constitutes a second peripheral wall portion.

In each of the above embodiments, power boards are constituted by ceramic circuit boards, but the power boards may also be metal circuit boards. In that case, power elements and semiconductor switching elements may be mounted to the metal circuit boards as bare chips, or discrete parts of the power elements and the semiconductor switching elements may be mounted to the metal circuit boards.

In each of the above embodiments, power elements and semiconductor switching elements are mounted to three power boards, but the power elements and semiconductor switching elements may also be mounted to a single power board.

In each of the above embodiments, the stator winding is explained as being wye-connected, but the stator winding may also be delta-connected.

In each of the above embodiments, a permanent-magnet synchronous motor is used, but the motor is not limited to a permanent-magnet synchronous motor provided that it can be used in a electric power steering apparatus, and an induction motor can be used, for example. A motor that does not use a permanent magnet is effective since magnet flux that interferes with switching of the power circuit is eliminated.

In each of the above embodiments, a rotation sensor is constituted by a resolver, but a rotation sensor that uses a Hall element may also be used, for example. In the case of a rotation sensor that uses a Hall element, because mounting space can be saved compared with a rotation sensor that uses a resolver, constraints on dimensions and shape of the circuit board when mounting the power boards are alleviated.

What is claimed is:

1. An electric power-steering apparatus motor apparatus comprising:
    a flat base portion on a first surface side of which a first bearing box is disposed;
    a tubular first peripheral wall portion that is disposed on a second surface side of said base portion and that functions together with said base portion to configure a control apparatus housing space;
    a tubular second peripheral wall portion that is disposed on an opposite side of said first peripheral wall portion from said first surface side of said base portion;
    a floored cylindrical motor frame that is that is disposed on an opposite side of said second peripheral wall portion from said base portion so as to function together with said second peripheral wall portion to configure a motor housing space, and on a bottom portion of which a second bearing box is disposed;
    a motor comprising:
        a stator comprising:
            a stator core that is held inside said motor frame; and
            a stator winding that is mounted to said stator core; and
        a rotor that is disposed rotatably on an inner circumferential side of said stator such that a first end region of a rotating shaft is inserted through said control apparatus housing space and is supported by a first bearing that is held by said first bearing box, and a second end of said rotating shaft is supported by a second bearing that is held by said second bearing box, a first end of said rotating shaft that projects out through said first bearing constituting a coupling portion; and
    a control apparatus that is disposed inside said control apparatus housing space, and that controls driving of said motor.

2. An electric power-steering apparatus motor apparatus according to claim 1, further comprising a rotation sensor that detects a rotational position of said rotor of said motor,
    wherein a coupling that is fixed to said coupling portion, a sensor rotor of said rotation sensor, and a bush that positions an axial position of said sensor rotor are fitted onto a portion of said rotating shaft that projects through said first bearing in sequence of said bush, said sensor rotor, and said coupling from a side near said first bearing.

3. An electric power-steering apparatus motor apparatus according to claim 2, wherein said rotation sensor is constituted by a resolver.

4. An electric power-steering apparatus motor apparatus according to claim 1, further comprising a rotation sensor that detects a rotational position of said rotor of said motor,
    wherein a coupling is fixed to said coupling portion, and a sensor rotor of said rotation sensor is fitted onto a portion of said rotating shaft on a side of said first bearing near said control apparatus housing space.

5. An electric power-steering apparatus motor apparatus according to claim 4, wherein said rotation sensor is constituted by a resolver.

6. An electric power-steering apparatus motor apparatus according to claim 1, further comprising a rotation sensor that is disposed in close proximity to said first bearing and that detects a rotational position of said rotor of said motor.

7. An electric power-steering apparatus motor apparatus according to claim 6, wherein said rotation sensor is constituted by a resolver.

8. An electric power-steering apparatus motor apparatus according to claim 6, wherein said rotation sensor is disposed on said first surface side of said base portion.

9. An electric power-steering apparatus motor apparatus according to claim 8, wherein said rotation sensor is constituted by a resolver.

10. An electric power-steering apparatus motor apparatus according to claim 6, wherein said rotation sensor is disposed on said second surface side of said base portion.

11. An electric power-steering apparatus motor apparatus according to claim 10, wherein said rotation sensor is constituted by a resolver.

12. An electric power-steering apparatus motor apparatus according to claim 1, wherein a control board that constitutes said control apparatus is disposed inside said control apparatus housing space such that said rotating shaft passes therethrough, so as to be perpendicular to a central axis of said rotating shaft, and so as to be separated by a predetermined distance from said second surface of said base portion.

* * * * *